United States Patent
Denton et al.

(10) Patent No.: US 11,534,711 B2
(45) Date of Patent: *Dec. 27, 2022

(54) METHOD AND SYSTEM FOR SOLID PARTICLE REMOVAL

(71) Applicant: CALANDRA RESOURCES, INC., Vancourver (CA)

(72) Inventors: Chris Denton, Mason, TX (US); Federico Carlos Resio, General Roca (AR)

(73) Assignee: Calandra Resources, Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/278,501

(22) Filed: Feb. 18, 2019

(65) Prior Publication Data
US 2019/0176070 A1    Jun. 13, 2019

Related U.S. Application Data

(63) Continuation of application No. 16/058,617, filed on Aug. 8, 2018, which is a continuation of application No. PCT/US2018/014106, filed on Jan. 17, 2018.
(Continued)

(51) Int. Cl.
*B01D 45/04* (2006.01)
*E21B 43/38* (2006.01)
(Continued)

(52) U.S. Cl.
CPC .............. *B01D 45/04* (2013.01); *B01D 45/12* (2013.01); *B01D 45/16* (2013.01); *B01D 50/20* (2022.01);
(Continued)

(58) Field of Classification Search
CPC ...... B01D 45/04; B01D 45/16; B01D 50/002; B01D 19/0052; B01D 46/2411;
(Continued)

(56) References Cited

U.S. PATENT DOCUMENTS

| 409,049 A | 8/1889 | Lewis |
| 2,777,533 A | 1/1957 | Segrest et al. |

(Continued)

FOREIGN PATENT DOCUMENTS

| CN | 101306264 A | 11/2008 |
| DE | 851483 C | 10/1952 |

(Continued)

OTHER PUBLICATIONS

English Machine Translation of DE 851483C (Year: 1949).*
(Continued)

*Primary Examiner* — Madeline Gonzalez

(57) ABSTRACT

Disclosed is a system and method to separate solid particle components from a fluid that includes a spherical vessel with a tangential inlet to introduce the fluid and a fluid exhaust and filter arranged on the center line of the interior of the vessel. A combination of pressurized fluid and solid particles enter at the tangential inlet and move primarily in a circular path around the interior of the vessel. The circular path results in the larger mass particles settling at the vessels lower region. Less massive particles may be entrained in the exiting fluid flow toward a filter element where they are removed from the exiting fluid. The vessel has an opening to remove the trapped separated particles.

20 Claims, 9 Drawing Sheets

Related U.S. Application Data

(60) Provisional application No. 62/618,325, filed on Jan. 17, 2018, provisional application No. 62/447,749, filed on Jan. 18, 2017.

(51) Int. Cl.
*B01D 50/00* (2022.01)
*B01D 45/16* (2006.01)
*B01D 45/12* (2006.01)
*E21B 43/34* (2006.01)
*B01D 50/20* (2022.01)
*B01D 19/00* (2006.01)
*B01D 46/24* (2006.01)

(52) U.S. Cl.
CPC .............. *E21B 43/34* (2013.01); *E21B 43/38* (2013.01); *B01D 19/0052* (2013.01); *B01D 46/2411* (2013.01)

(58) Field of Classification Search
CPC ............... B01D 21/00; B01D 21/2411; B01D 17/0217; B01D 2201/31; B01D 21/26; E21B 43/38
USPC .............................. 210/299, 304, 248, 512.1
See application file for complete search history.

(56) References Cited

U.S. PATENT DOCUMENTS

| | | | |
|---|---|---|---|
| 2,861,647 A | 11/1958 | Musslewhite | |
| 2,903,087 A | 9/1959 | Glasgow | |
| 2,925,720 A | 2/1960 | Dorsey et al. | |
| 3,008,538 A | 11/1961 | Glasgow | |
| 4,147,630 A * | 4/1979 | Laval, Jr. | B04C 5/00 |
| | | | 210/137 |
| 4,908,049 A | 3/1990 | Yoshida et al. | |
| 5,413,705 A * | 5/1995 | Tammera | B01D 21/265 |
| | | | 210/163 |
| 5,827,357 A | 10/1998 | Farion | |
| 5,928,519 A | 7/1999 | Homan | |
| 6,162,284 A | 12/2000 | Mitchell et al. | |
| 6,214,092 B1 | 4/2001 | Odom et al. | |
| 6,315,813 B1 | 11/2001 | Morgan et al. | |
| 6,752,860 B1 | 6/2004 | Hoydal et al. | |
| 7,078,439 B2 * | 7/2006 | Odueyungbo | C10G 2/33 |
| | | | 210/295 |
| 7,785,400 B1 | 8/2010 | Worley et al. | |
| 8,623,221 B1 | 1/2014 | Boyd et al. | |
| 11,358,082 B2 * | 6/2022 | Denton | E21B 43/34 |
| 2016/0375386 A1 * | 12/2016 | Magnus | B01D 45/04 |
| | | | 95/267 |

FOREIGN PATENT DOCUMENTS

| | | |
|---|---|---|
| RU | 2481144 C1 | 5/2013 |
| WO | 2015188850 A1 | 12/2015 |
| WO | 2016022463 A1 | 2/2016 |
| WO | WO2016022463 | 2/2016 |
| WO | WO2017000062 | 1/2017 |

OTHER PUBLICATIONS

Office Action dated May 1, 2019 in U.S. Appl. No. 16/058,617.
PCT International Search Report dated May 31, 2018, application No. PCT2018/014106, "Method and System for Solid Particle Removal," filed Jan. 17, 2018, 3 pages.
International Preliminary Report of Patentability dated Jul. 23, 2019, application No. PCTUS2018/014106, "Method and System for Solid Particle Removal," filed Jan. 17, 2018, 21 pages.

* cited by examiner

METHOD AND SYSTEM FOR SOLID PARTICLE REMOVAL

CROSS-REFERENCE TO RELATED APPLICATIONS

This application is a continuation application of U.S. Non-Provisional patent application Ser. No. 16/058,617 filed Aug. 8, 2018; which is a continuation application of International Application No. PCT/US2018/014106 filed Jan. 17, 2018; which claims the benefit of U.S. Provisional Application No. 62/618,325, filed Jan. 17, 2018, and the benefit of U.S. Provisional Application No. 62/447,749, filed Jan. 18, 2017; the entirety of all which are incorporated by reference.

FIELD OF THE INVENTION

The present invention relates to separators used in oil and natural gas well completion and production operations and, more particularly, to generally spherical separators particularly suited for use in separating solid material from high pressure, high velocity fluid streams encountered at hydrocarbon wellheads or equivalent.

BACKGROUND OF THE INVENTION

For over 100 years oil and gas extraction from hydrocarbon-rich subterranean locations has been performed predominately via chipping, drilling or other means in a vertical hole in the earth surface to access oil and gas rich regions. These hydrocarbons have been critical in economic and technical advancement throughout modern civilization and provide energy, transportation fuel, and chemical precursors for fertilizer, materials, pharmaceuticals and a myriad of other chemicals and technologies.

However extracting hydrocarbons has become more difficult and more technical as drillers are required to reach deeper and more difficult reserves and to deliver greater quantities of hydrocarbons from each reserve. Advanced methods to increase extraction include chemical means such as surfactants and solvents in injector wells and Steam Assisted Gravity Drainage or SAGD to name two of several. In addition, many wells use the technique of the horizontal drilling, wherein the drilled well bore or hole, after having been drilled vertically thousands of feet to reach oil-rich strata, will be further drilled substantially horizontally, developing a well bore or hole in the horizontal strata.

Additional methods include mechanical and chemical techniques such as hydraulic fracturing. Hydraulic fracturing or fracking involves injecting a large quantity of high pressure fluid and solid particle mixture into the well, opening existing fissures and fractures and even possibly creating new fissures and fractures, thereby increasing the volume of oil or gas from each well, or to make existing wells produce for longer periods of time.

Generally, these oil, oil and gas, or gas wells, which may be enhanced by hydraulic fracturing produce not only oil and gas but also water, other liquid impurities and particle solids called collectively a fluid stream. The source of the undesirable solids contamination may be from the hydrocarbon-rich rock formation itself or by added materials such as fracturing proppant, for example ceramic spheres or sand. The dimension of the solids will be variable, from high diameter particle and particle aggregates which can nominally be larger than 0.1 inch diameter, to very small diameter particles and particle aggregates, which can be less than 0.005 inch diameter. The proppant is generally used in conjunction with large volumes and pressures of additive containing liquids to expand existing fractures in the formation, and to "prop open" the fissures. The liquids additives are chosen with the objective, among other things, of increasing the viscosity of the fluid so it will better transport the proppant to the end of the fracture. Once the fracturing process is completed, at least a portion of the additive containing liquid or gas or a combination will return through the well bore back to the wellhead, usually under high pressure. Whether the material originated from the hydrocarbon-rich rock formation or from solid materials such as various types of proppants, they are referred to herein as "sand" or "solid particle components" unless otherwise specified.

The combination of solid particle components with a fluid stream, especially under high pressure, will cause surface erosion or deterioration in oil and gas well components such as wellheads, valves, fittings and the like. Erosion caused by the presence of the solid particle components in the fluid stream can cause equipment damage including system failure. System failure can cause massive loss of property and even human life. In addition, these solid particle components also contaminate further processing and can cause significant equipment deterioration over short periods of time.

Sand separating systems, in general, exist to separate solids and solid particle components from a liquid stream or from a gas stream or from a combination of a liquid and gas stream and will be referred to as a fluid stream to describe any combination of gas, oil, water and solids. The systems may be spherical, cylindrical or conical or a combination of cylinder and cone, most often oriented with the long axis of the system in the vertical direction. The dimensions of a conventional fluid and solid separation system are chosen to allow the fluid stream to undergo a sufficiently large velocity drop to facilitate solids removal before the fluid stream exits the separator. In some separator systems, an impact plate may be added internally for the high velocity solids and fluid to impinge.

Historically, these predominately cylindrical or conical separator systems have been effective when the inlet fluid stream has a substantially low velocity and a relatively low fluid flow rate. Additionally, the fluid stream usually has had low fractions of solid particles to overall volume of fluid and said solid particle components are substantially of the same dimension. In the case of added particles, such as for hydraulic fracturing, the particle diameter is selected to be appropriate for a given well. At higher fluid velocities, and greater distribution of the solids dimensions, these conventional separators significantly lose the efficiency of the solid separation. These systems are not suited to high velocity fluid streams containing large amounts of variably sized sand and water compositions that are most often encountered at or near the wellhead. The higher the velocity of incoming fluid and the smaller the solids sizes, the greater the relative drag force on the moving fluid and particles. In this high velocity, small particle sized environment, the standard separator will not function effectively and will not remove a large fraction of the solids.

For a conical or cylindrical sand separator to work safely at pressures in excess of 10,000 psi, the wall thickness of the separator, for example, can be steel more than 3 inches thick. Thus, the size, weight, material and cost of such a system becomes impractical, difficult to manage and cost prohibitive.

A system that can effectively separate a wide range of solid particle sizes from a high volume, high velocity stream in a smaller and lighter package, made with less expensive material is needed in the industry. The separator system of this invention solves these historical shortcomings.

SUMMARY OF THE INVENTION

We describe a vessel whose interior and associated piping, tubing, flanges, fittings and filters are used to separate solids from a fluid stream. The fluid can be various liquids or various gases or liquids and gases together. The vessel and its associated sub-systems are installed in relatively close proximity to an oil or gas well exit known as a wellhead and are thusly exposed to at or near maximum pressure of the well. The invention is constructed to utilize a combination of real and apparent mechanical forces including gravitational and centrifugal, as well as from time to time, and if required, mechanical filtration to separate solid particle components from fluid. The previously mentioned forces, separator device and mechanical filtration when required, will cause the larger solids to deposit and remain at the bottom of the interior volume of the vessel and also, if used, the filter will remove some remaining smaller particles, and will cause the exiting fluid to be substantially free of solid particles. The presence or absence of the subsequent mechanical filter should not typically be limiting and one skilled in the art will recognize that the preponderance of filtering occur within the enclosure of the sphere. The combination of the separation techniques allows the system to handle a wide range of solid sizes, a wide range of fluid constituents, and the efficiency of the separation will be less sensitive to the fluid velocity.

The solid particle separator has predominately a spherical interior volume. The exterior may also be spherical but may be other geometries as is warranted by the specific use, by fabrication techniques, and will be recognized to one skilled in the art to have no bearing to the interior surface, function or volume. In addition, the interior could be a geometry that is smooth, regular and wider in approximately the central region and narrower at the non-equatorial regions including such geometries as elliptical and smooth double conical. In addition, all diameter transitions are smooth and regular. The conventional location for installation and use is at or near the wellhead of an oil or gas well but this should not be limiting, as the separation effect is independent of placement.

The solid particle separator may be installed as a single separator, or any number of separator systems may be used, with two in parallel as a conventional configuration, but many arrangements of separators may be used and the specific arrangement of separators is not a limitation and one skilled in the art will recognize this. The inlet port is arranged around the horizontal plane and is conventionally located slightly above the sphere of the separator equator or midplane and tangential to the interior surface of the sphere. This allows the inlet fluid and solids mixture to travel in a roughly disc-shaped flow pattern upon entrance to the interior region of the separator. The angular velocity of the mixture is in part determined by the inside diameter of the interior region at the inlet height and the velocity and also viscosity of any introduced fluid.

While the invention is generally described to be placed after a hydrocarbon wellhead, a wellhead can mean any source of fluid including an oil well, a gas well, a mechanical pump exit or any source of fluids that can be input to the device.

A particle that enters predominately tangentially into the sphere will be subjected to a variety of real and apparent forces including but not limited to:

Gravitational force insomuch as the particle will have only horizontal velocity, the weight of the particle will cause it to move substantially out of the horizontal plane and to begin moving to the lower portion of the sphere;

Centrifugal force insomuch as the fluid and particles entering the sphere, substantially tangentially, will have angular velocity of the particle which will cause a centrifugal force that will move the particle to the wall of the sphere; upon or after the particle makes contact with the inner spherical surface, it will be caused to slide downward following the expanding slope of the wall, as the initial plane of rotation is predominately above a horizontal mid-plane; and Coriolis Force insomuch as the angular movement in a horizontal plane may cause an apparent force exerted on the particle, which will affect the particle in a downward direction.

It will be recognized to one skilled in the art that the name and description of the forces, and to what amount each has action on the particle is in no way limiting to the scope of the invention.

The solid separator system is comprised of an interior volume that is predominately spherical which is alternately known as an ellipsoid of revolution with a single focus, but it can also be an ellipsoid of revolution with two foci or a non-ellipsoidal oval of revolution or a combination of smooth conical features with ellipsoidal or spherical features. When the interior is described as spherical it will be recognized by one skilled in the art that it is a range of shapes from spherical to an ellipsoidal volume to an oval volume with the general feature that the center is larger than the poles.

The solids that are removed from the fluid can be native sand from the formation or fracking sand or fracking proppant in the form of, for example, ceramic particles, or drilling cuttings or other solid particle components that have been added as part of the development of a well or that are naturally occurring in the region prior to drilling or a combination of the two. In addition, these solid particle components may be singular particles or may agglomerate as composite particles connected by chemical means, electrostatic means, a combination, or other means. This configuration of solid materials entrained in a fluid as referred to hereinafter as solid particle components, and one skilled in the art will recognize that these descriptions should not be limiting, and any entrained solid particles or solid agglomerates will be referred to as a particle or collectively as particles. Also in this case fluid refers to liquid such as water, oil or other liquids encountered at the well, and to gases such as naturally occurring methane, added carbon dioxide or other non-liquid, non-solid materials. Fluid can also refer to sublimed materials.

Once the fluid and solids in the form of particles or particle agglomerates or other configurations of solid materials that are entrained in a fluid flow emerge from the wellhead they enter the separator via an entrance port or tube that is located slightly above the mid-plane of the interior sphere volume and is located tangentially to the interior surface of the sphere volume.

Once the high-pressure fluid and particles are introduced tangentially into the volume of the separator, the fluid and particles are in a predominately circular path. The said forces will cause said solid particles to move in a substantially radially outward and downward direction.

The particle, becoming proximate to the interior surface of the separator, will migrate to the lower section of the sphere due to one or more effects of forces exerted on the particle.

Some particles may remain entrained in the fluid flow and can be separated from the exiting fluid by means of additional filters through which all exit fluid traverses.

The fluids exit is substantially at the center top of the separation device. The moving fluid and any entrained solids will leave the sphere through said exit. The solids that are acted upon and moved by the fluid to the center of the sphere, will be filtered with a dedicated filter that can be internal to the sphere or external to the sphere with the preferred embodiment having the filter external to the sphere. The fluid transporting the still entrained solid particles will impinge upon and transit through the filter.

In general, said filter is of cylindrical construction with the long axis arranged to be collinear to the fluid flow direction. Typically, the fluid transits through the surface of said filter device. Said fluid can transit either from the interior surface outward or from the exterior surface and move inward. Said filter can be located in a variety of locations with no change to the operation of the invention or to the invention. Said filter can be contained within the interior and generally arranged more or less on the polar axis extending from one interior surface to the interior of the sphere of the spherical separator or is further contained in a structure that is of larger internal diameter than the external diameter of said filter element and is operated outside of the separator. Further, separator can be used with or without the filter elements.

The input port that allows the high pressure, high velocity stream of material to be introduced into the interior volume of the separator is most often arranged slightly above the mid-plane and is located tangentially to the interior surface. This allows the high-pressure combination of fluid and solids to be launched in a trajectory slightly above the mid-plane. However, the input may be at or below the midplane.

The sections of the separator device can be joined using a variety of techniques common to metal fabrication including using welding techniques to permanently connect the portions of the sphere that have been forged, machined or otherwise constructed. Also, the separator can be constructed using bolts, flanges and the like to join the various portions of the separator body. In addition, if the device is made in two sections, those two sections can be connected by using threads. One skilled in the art will recognize that the methods, if any, to connect the separator will not limit its use, or operation or function. In addition, if a filter is to be connected, it may be connected using threaded mating components but one skilled in the art will recognize that the filter can be affixed using one or more of several means including threads, bolts, flanges, mounts, keepers and the like and this is not a limitation of the invention.

The invention is designed with materials and techniques to allow it to be used at wells, wellheads and other sources of fluids and pressures. The invention can be used with pressures from a few hundred psi to pressures in excess of 20,000 psi. In addition, the device can be sized to most appropriately accommodate the range of pressures, viscosities, and solids encountered. The internal volume can range from sizes smaller than 10 cubic feet to sizes larger than 40 cubic feet. The specific size will be chosen to best function with incoming pressures and compositions. Also, the inlet port dimensions are chosen to also accommodate incoming pressures and compositions, in addition to the existing fitting, tube and pipe size encountered at point of use. Common sizes of inlet port sizes are smaller than 0.5 inches to larger than 5 inches. The inlet port offset can also be chosen to best accommodate the pressures, viscosities, chemistries, and solids encountered at the point of use. Common offsets can be smaller than 0.5 inch and more than 10 inches. Both the lower and upper ports can be a range of sizes to accommodate the pressures, flows, solids content and other parameters. Common port sizes can range from smaller than 1 inch to larger than 8 inches.

The invention can be used in parallel to increase throughput or to effectively decrease pressure in each unit and the invention can be used in series with either identical devices or differently sized devices to maximize filtration efficacy and this is not a limitation.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
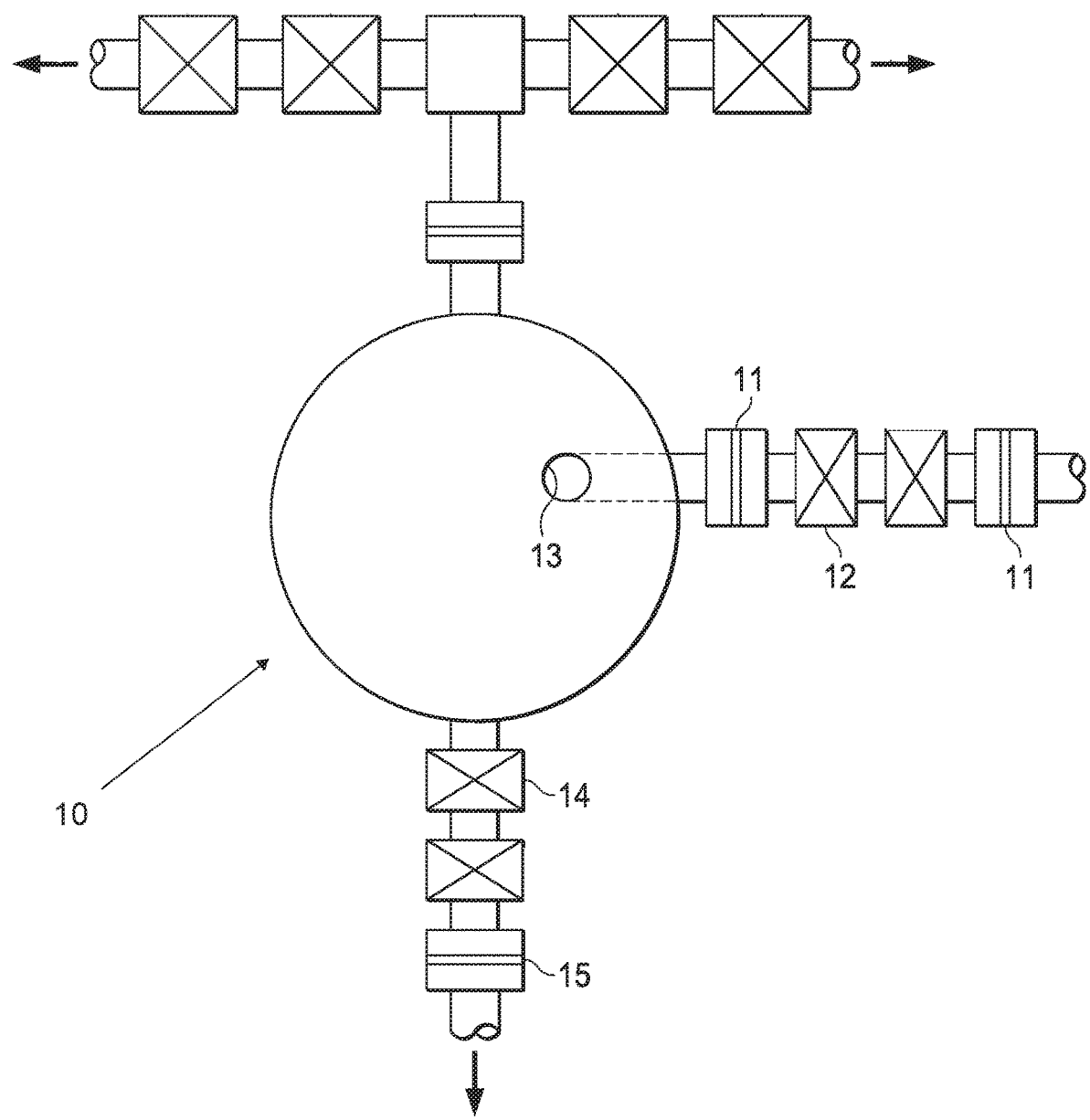
FIG. 1 shows in schematic the invention with a single sphere.

While the invention has been particularly shown and described with reference to preferred and alternate embodiments, it will be understood by those skilled in the art that various changes in form and detail may be made therein without departing from the spirit and scope of the invention.

The apparatus of this invention is designed to separate particle solid components from high pressure, high velocity fluid streams. As used herein, fluid and fluids shall be understood to be the non-solid portion of the material entering a separator and can be comprised of liquids and flowback fluid like water, brine, solvents, surfactants and hydrocarbons and can be exiting gases like naturally occurring natural gas, or an added gas added to the well either in liquid phase or gas phase such as a fracking or flowback additive or aid or other material, and all such variations are contemplated to be found within the invention's operating specifications. As used herein, solid particle components shall be understood to be solid phase materials and aggregates that are entrained by the movement of the fluid entering the separator. Said fluid is comprised of water, chemicals, gases and solids. The device is designed to handle the high flow, high velocity and high-pressure fluid and solid streams while maintaining effectiveness at separation of solid particles. During continued operation, the composition of the fluid entering the separator may change from a fluid comprised of predominately liquid based constituents with minimal gas components to subsequently a fluid stream comprised of a predominately gas fluid with lower quantities of liquid entrained in the fluid transport.

Under high pressure or high fluid flow or both, solid particles components are entrained in the fluid flow, and travel substantially with the flow of the high pressure and high velocity fluid. The particles may have an overall velocity that is less than or greater than the average fluid flow velocity. This untreated and un-separated flow of fluid and solids can cause substantial damage and erosion on interior surfaces of equipment. One having ordinary skill will recognize that the majority of the entrained solids are fracking proppant and naturally occurring formation particles and all such variations of particle composition are contemplated to be found within the present inventions operating environment. The invention can work with all pressures conventionally encountered at wells but if future well pressures are found to be greater, the invention will be expected to work at greater pressures. In addition, the device can be expected to work at lower pressures as well. There is a general relation between incoming pressure and vessel size.

This invention comprises a vessel having an internal generally spherical region or cavity that will allow a high pressure and high velocity fluid and solid particle stream to enter said interior cavity. In an embodiment, the vessel is known as a separator. Unlike other solid particle separators, this device does not use any baffles or deflection plates or other additional means to reduce fluid and particle velocity. This separator uses natural fluid flow and the principles associated with angular momentum and other real and apparent forces to separate particles from a fluid stream.

Referring to FIGS. 1-12, the present invention comprises a solid particle component removing device that separates solid material from a fluid stream, herein called a separator, installed in proximity to and downstream to a wellhead and upstream from other support equipment such as a choke valve manifold, or other in-line equipment. The solid particle component separator causes solid particles and particle aggregates from a fluid stream including a high-pressure high-velocity fluid stream to migrate to substantially lower regions in the separator device. Particles with a mass greater than a threshold amount are collected in the bottom of the device and said collected particles can be removed or extracted by means of a removal port, valve, device or schema generally on the bottom of the device. Any particles that remain entrained in the fluid flow may be separated by means of a mechanical filter external to the body of the separator.

Valves throughout this invention are generally included in pairs to facilitate the efficient isolation of sections of the device to change filter elements, change separator devices, to remove sand and other particles and to facilitate the aforementioned changes and others without causing the well to be closed or shut-in or for high-pressure fluid or solids to exit the system in an uncontrolled fashion however in no way should they be inferred to be a limitation on invention and are simply included as one non-limiting embodiment.

FIG. 1. shows the separator device 10 including inlet port flange or connection surface 11, the inlet tube or pipe 12, with penetration into a sphere or separator device 10 via port 13. In addition, solids removal or outlet tube and port flange 14 and fluid exit flange 15.

Predominately following a wellhead and associated hardware, the solid particle component separator removes a large mass range of solids including those removed by means of mechanical and apparent forces, higher angular momentum and gravity, and those lighter solids removed by mechanical filtration.

Figure 2:
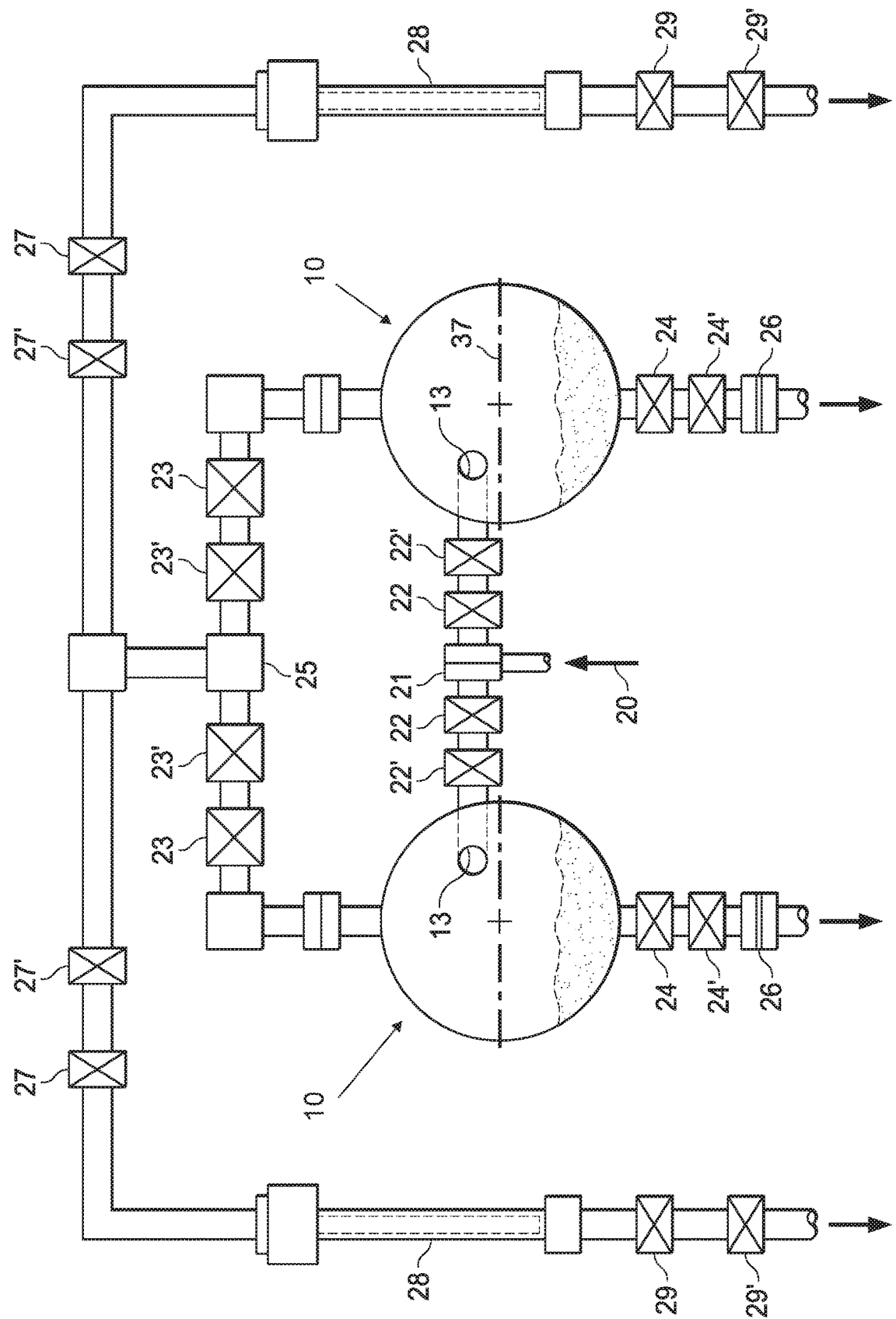
FIG. 2 shows in schematic the invention with two separators, operated in parallel, attached to a single wellhead and a plurality of valves.

FIG. 2 shows, schematically, multiple separators used in parallel and a plurality of connection and isolation valves. Two separators 10 are indicated but one skilled in the art will recognize that any number of separators can be used. Incoming fluid and solids are introduced through inlet 20 and through manifold 21, allowing multiple separators to be used. Separators can be isolated by valves 22 and 22', 23 and 23' and also 24 and 24', all of which can shut off the incoming or exiting materials to facilitate servicing, adjustment or replacement and further can isolate said separator 10 allowing service or use of and alternate separator 10. Port 13 is substantially at or above the mid-plane 37. One will also recognize that any effective number of separators can be arranged in series, in parallel or a combination of series and parallel, and that the specific number in use is not a limitation as well as the valves, fittings and flanges are simply one embodiment and should not be construed as limiting Prior to fluid entering said separator 10, there can be a plurality of valves, manifolds and associated equipment conventionally found at wellheads including schematically shown manifold 21, valves 22, exit valves 23 and exit manifold 25. The inclusion or omission of any associated equipment other than the invention herein should be recognized by one of ordinary skill in the art to not change the invention or use. Valve 22 serves to route or control flow of fluid to separator. One having ordinary skill in the art will recognize that valves 22 and 22' are representative in nature and there are conventionally additional wellhead equipment between the wellhead and the separator and the valves 22 and 22' is not intended to represent a complete installation but merely to illustrate that the separator can be isolated as required.

Solids can be removed by opening valves 24 and 24', most often when valves 22 and 22' and 23 and 23' are closed to allow the removal of solids with no associated high well pressure. In addition, FIG. 2 shows upper filter isolation valves 27 and 27', external filter 28 and lower filter isolation valves 29 and 29'. The inclusion of an external filter is one embodiment and should not be construed as limiting, as the invention can be used with or without a filter and the filter, if used can be internal or external.

Figure 3:
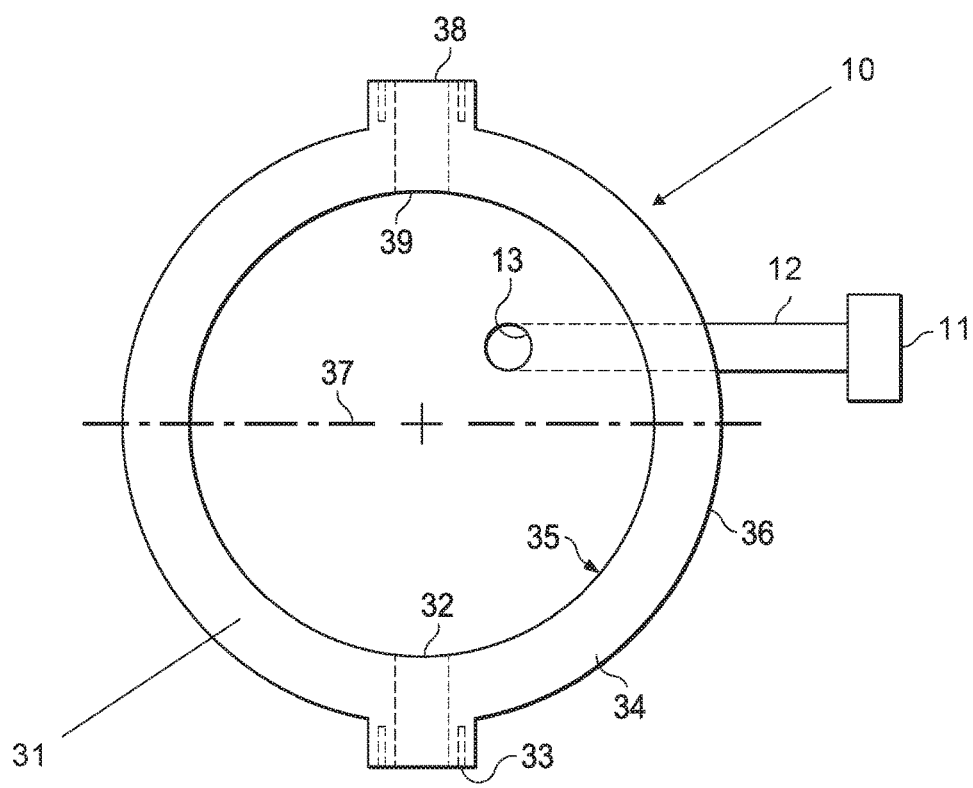
FIG. 3 shows a side view of the separator with the inlet both above the center plane and tangential to the vessel interior.

FIG. 3 shows inlet port flange 11 which allows the connection of a source of fluid and solids into the interior of the separator 10 via the inlet tube 12 and penetrating into the interior of the separator 10 through inlet tube hole 13. Solid material that has been separated can be removed through separator sphere opening 32 and continuing through bolt surface 33. Separator sphere 34 has both an interior surface 35 and exterior surface 36 that define a wall 31. Separator 10 has a mid-plane 37, of which the inlet port components 11, 12 and 13 are at or substantially above. Upper bolt surface 38 is a surface to mount additional manifolds and other apparatus through which the pressurized fluid may exit the device. The specific mounting schema may comprise a machined mounting surface and bolt holes, a tube and flange system or other connection methods and should not be construed as a limitation.

In addition, said separator 10 comprises a high pressure, high fluid volume vessel. Said separator 10 comprises an outer surface 36 and an inner surface 35 that can be spherical, nearly spherical, elliptical, oval or other geometries where the region near or about the midplane is of greater diameter than those areas closer to the upper and lower port penetrations 38 and 33, respectively. One skilled in the art will recognize that the surface geometry does not materially affect the separator function. Required penetrations comprise an inlet port system 11, 12 and 13 to introduce high pressure high volume fluid and solid particle components into the separator, a fluid exit bolt surface 38 and fluid exit penetration 39 as well as a collected particle extraction port 32 and mounting surface 33. Other penetrations could include but are not limited to pressure sensing ports, fluid velocity sensing ports, and particle level detection ports, none of which are material to the operation of the separator.

Separator vessel 34 or separator sphere 34 is constructed of such materials and by such processes that will provide suitable structural integrity to withstand the range of pressures expected, as well as in excess of those pressures at a wellhead, without requiring systems or equipment to reduce incoming pressure such as chokes and other means, which are frequently encountered on other types of separators and significantly limit their use and said pressure restriction can damage a well. The separator input system 11, 12 and 13 are substantially tubular and substantially horizontal with respect to the midplane of the separator. The separator input system 11, 12, 13 is more or less tangential to the interior of the sphere. The separator input system 11, 12, 13 is substantially arranged at or above the midplane 37 of the separator. The input tubular structure or inlet tube or pipe 12 extends from the body of the separator 34 to a distance that will allow convenient connection to associated well hardware. The input or inlet port flange or connection surface 11 is of a sufficient diameter to allow sufficient flow and material velocity within the separator 10 to achieve separation. The inside diameters of the inlet tube 12 can range from a fraction of an inch to several inches with an inside diameter of 2 inches being a common size.

Solids removal penetration 32 at the lower section of the separator 10 allows solid particle components removal and disposal after a suitable quantity has been collected. Said solids collected may be comprised of dry particles or may be comprised of solids and liquids, a slurry or other collected materials prior to extraction. Collected solid material refers to those particles that have come substantially to rest in the lower portion of the separator 10 and are not in substantial motion, though to one skilled in the art it will be clear that some degree of solids motion is possible and does not change the operation of the device. Alternately the lower portion of the vessel can comprise a schema for the continuous or semi-continuous removal of solids from the separator. To one skilled in the art, it will be apparent that the invention remains substantially unchanged in either embodiment and is not a limitation.

One preferred embodiment has dimensions as follows but one skilled in the art will recognize the dimensions can be changed with no adverse change in the functionality of the separator. In addition, one representative embodiment is described but should not be a limiting factor as other dimensions will be equally effective. The inlet port 11 from FIG. 3 is approximately 3 inches above the horizontal midplane. The exterior radius is substantially 23 inches and the internal radius is approximately 20 inches. The initial surface of the fluid inlet is 26 inches from the centerline. The separator 10 is approximately 50 inches tall from surface 33 to surface 38 on the central vertical axis, including built up areas for fittings. The central bore of the inlet tube 12 is about 19 inches from the midplane. The upper fixturing surface built up region is approximately 14 inches in diameter and the lower fixturing built up region is approximately 8 inches diameter.

The separator 10 has materials and joining techniques suitable to withstand pressures encountered at wellheads. Nominal wall thickness is approximately 3 inches but this is not a limitation and the separator can be constructed with wall thickness to correspond to specific pressures encountered at point of use. The wall thickness will need to be in a range that can be sourced, manufactured and fabricated. The well pressure will range from what is commonly known as shut-in pressure as the highest to zero and can range from lower than 500 psi to more than 20,000 psi. The vessel wall thickness, joining specifications, fixturing and fitting will be sized to accommodate specific pressures and one skilled in the art will recognize that changes to accommodate pressure does not change the operation of the separator or the invention and that different use locations will correspond to different working pressures.

Figure 4:
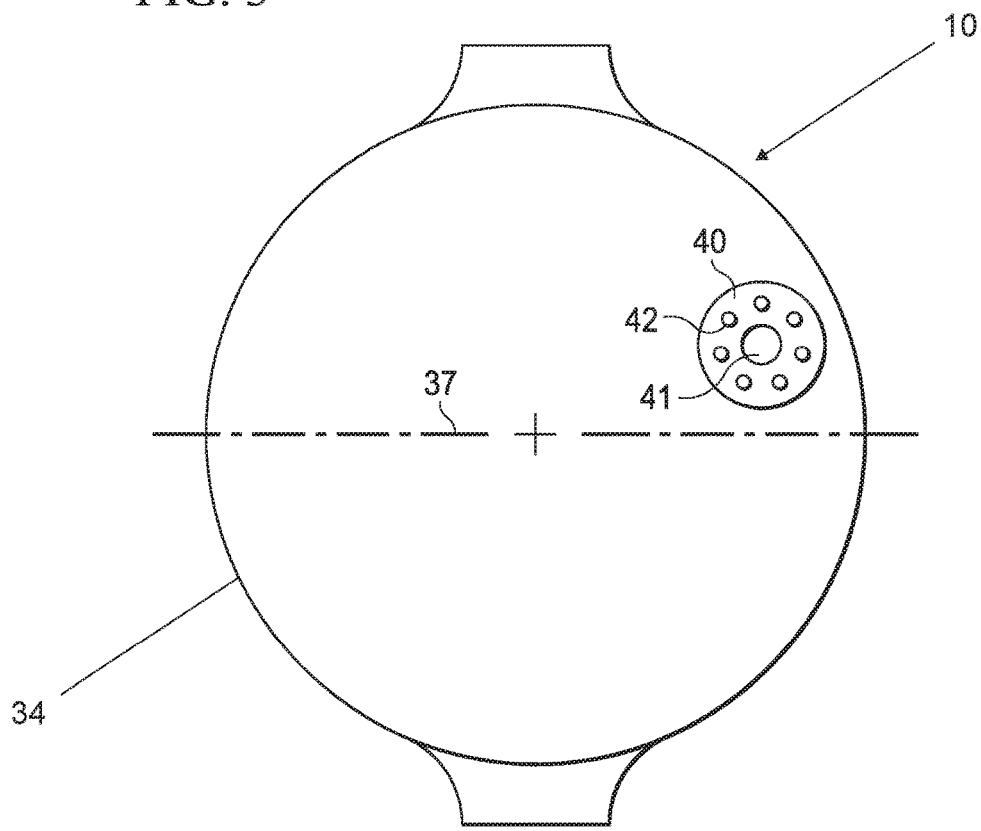
FIG. 4 is an additional view of the entrance port showing its tangential entry and the location above the mid-plane of the separator including input flange with through holes and central opening port.

FIG. 4 provides an additional illustration of the exterior of separator vessel 10 drawing attention to the tangentially arranged inlet system 11, 12, 13, that is comprised of connection surface 40, with connection points 42 through inlet tube interior 41, that is arranged substantially above the mid-plane 37 of the separator. This is only one embodiment of a large number of connection schema and should not be considered a limitation. The location and arrangement of the fluid inlet offset is determined by the separator dimensions, fluid characteristics, pressures and viscosities of a given well, and is not a limitation. Fluid and solid particle components are delivered to the separator vessel by apparatus, tubing and equipment conventionally used from a wellhead. Said separator 10 can be supported directly on the valves, manifolds and fixtures below the separator or can be supported by a stand, by legs structurally attached to the separator 10 or by chains or cables that support the separator 10 or by other support means. The method of support does not change the function of the separator 10 as one skilled in the art will recognize. The separator 10 can be on a mobile skid, or other system designed to be transported from site to site as well as mounted in a mobile environment as a trailer or truck and one skilled in the art will recognize this is not a limitation on the function of the invention. One having ordinary skill in the art will understand that the fixturing and mounting does not change or augment the essentials of operation. Fluid is directed essentially from the wellhead to the separator 10. Manifolds, tubular structures and valves as well as other systems encountered at the well site may also be in-line or in conjunction with the separator 10, and one skilled in the art will understand those components will not change the operation of the separator 10. Solid particles are removed through port 33 at the lower portion of the vessel. During operation, the extraction area is sealed to allow the separator 10 to operate at conventional operating pressures encountered at the wellhead.

Particles collected can be removed by opening to allow extraction of the solids when pressure is isolated from the sphere by valve 22 and through port 32. The upper region of the sphere 34 comprises a fixturing system and mounting surface 38 to maintain and support the filter system and the fluid exit port 39. After the fluid and solid particles have entered the separator 10 through port 11 and have been acted on by the separator 10 the solid materials are predominately stationary in the lower region awaiting collection and removal through opening 32. Lighter particles that remain entrained in the fluid are removed by the filter element that can be located either internal to the sphere 34 or external. The filter element is arranged to be removed for cleaning, servicing and replacement. The vessel fittings and fixtures for use in conjunction with the filter comprises a threaded opening that allows for installation and removal using threads or clamps or bolts or other fixturing schema. It will be recognized by one skilled in the art that the specific means for attaching a filter is not material to separator performance and a wide range of fixturing systems can be used with no change in the inventive concept.

Figure 5:
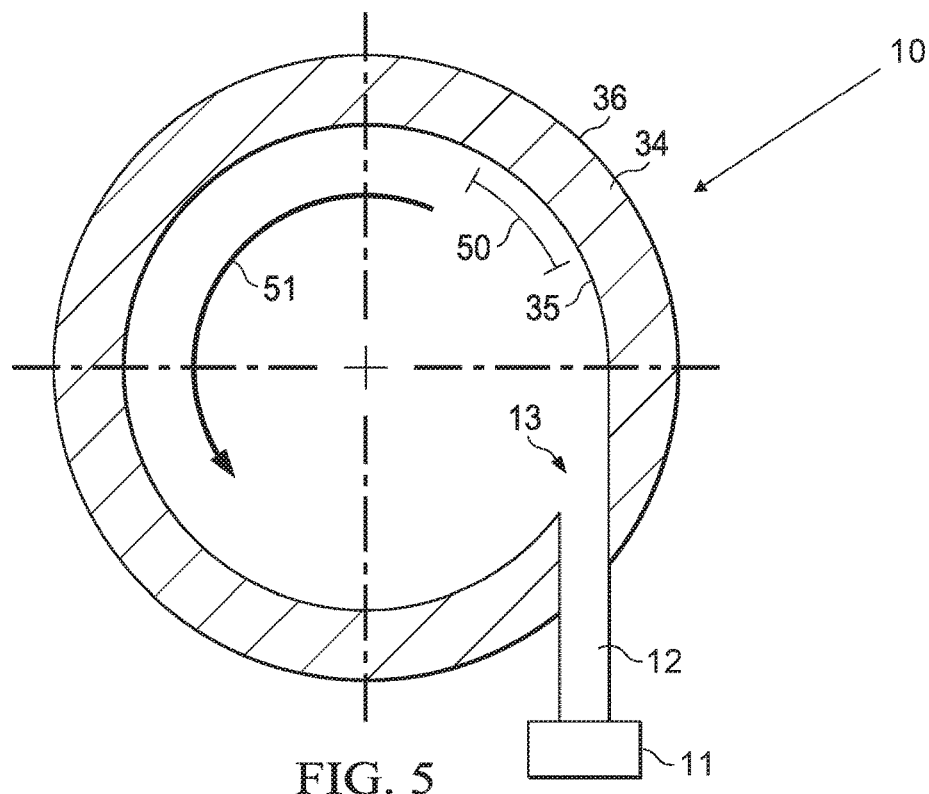
FIG. 5 is a top-down cross section view of the separator with the port shown to enter substantially tangentially to the interior region.

FIG. 5 shows a top down view cross section of the vessel more or less above the midplane 37, highlighting the tangential inlet port flange 11, inlet tube 12 and separator penetration or port 13, that is arranged primarily above the horizontal mid-plane 37. A solid particle component that enters the separator 10 will contact the internal surface 35 of the separator 10, for example, in or around region 50. Said particle will move generally in path 51.

Figure 6:
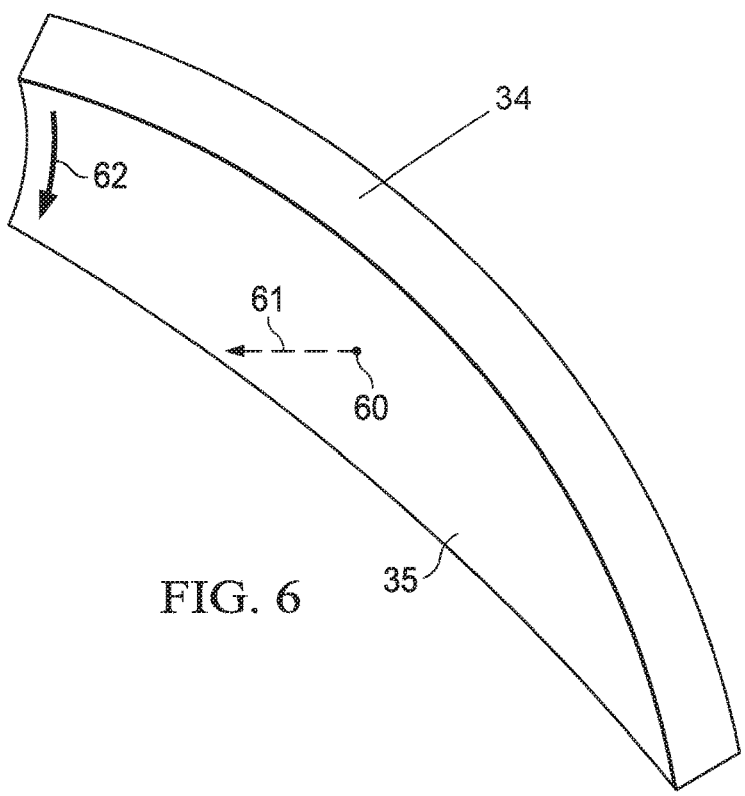
FIG. 6 is a is a schematic of a particle path internal to the separator.

FIG. 6 shows a generalized section of the separator 10. Particle 60 moves both around the sphere 34 and generally will be move to larger sphere radius during said transit. Because particle 60 is introduced generally above the midplane, the particle will move to regions of larger internal diameter. Particle 60 will travel through direction 61, in contact with vessel interior surface 35, as said particle 60 moves at first to larger vessel diameters by means of traveling along expanding wall diameter 62, until particle 60 is substantially at the midplane 37, said midplane 37 is the region of maximum vessel diameter. As particle 60 moves to regions of larger diameter, the momentum of said particle 60 will decrease and additional forces including but not necessarily limited to gravity will contribute to said particle 60 moving to substantially lower regions of the separator 10. As particle 60 moves to lower regions of the separator 10, progressively less energy from the moving fluid is imparted to the particle 60. Eventually a preponderance of particles will become more or less stationary and collected at the lower region of the separator 10.

Figure 7:
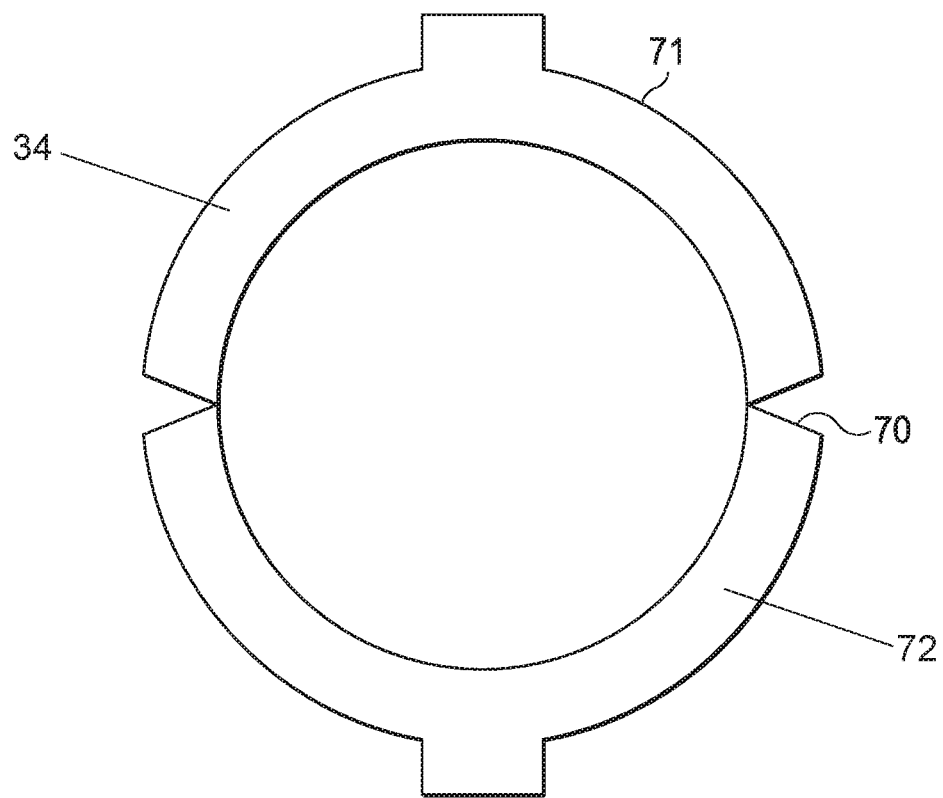
FIG. 7 shows a bevel or chamfer to facilitate joining portions of the sphere together using butt welding.

FIG. 7 schematically shows two halves of the sphere 34 with a welding bevel 70 arranged substantially at the midplane 37 of the separator 10 comprised of one side from upper chamber half 71 and one half of the welding bevel from lower chamber portion 72. For manufacturing, the vessel or sphere 34 is comprised of two or more sections that are welded or bolted or otherwise joined to provide an essentially featureless vessel interior. While FIG. 7 schematically indicated two halves 71 and 72, and a welding bevel 70, one skilled in the art will recognize that more than two pieces can be assembled to create a separator vessel 34 and that methods other than welding can suitably join the sub-systems including but not limited to bolting, threading, friction fitting, press fitting, riveting, or other methods of suitable joinery. In addition, fabrication methods may include construction from a substantially single piece of material. Method of fabrication is not a limitation and one skilled in the art will recognize that the invention is independent of method of construction and fabrication.

Figure 8:
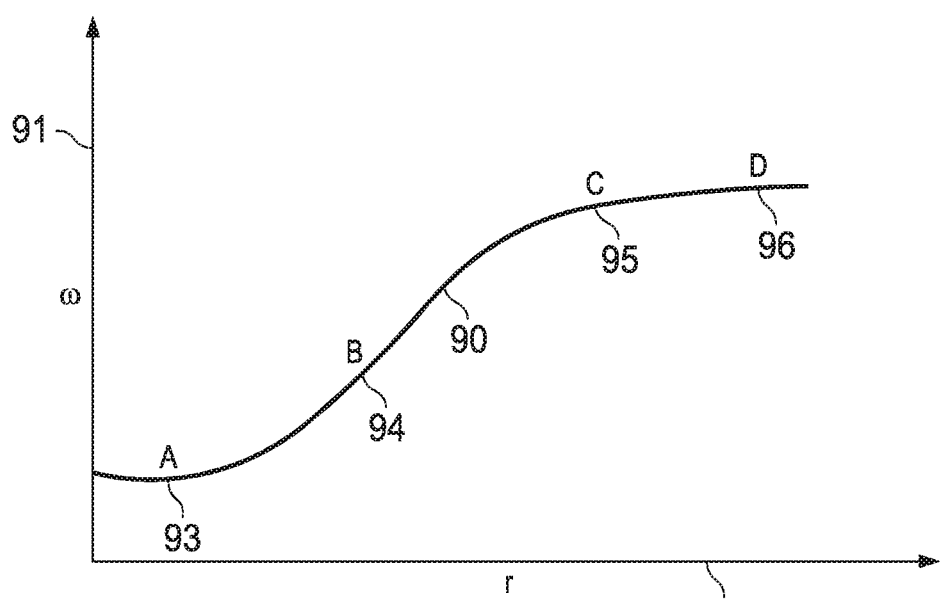
FIG. 8 shows an idealized plot of angular momentum versus the radial distance from the chamber center.

FIG. 8 shows a velocity profile 90 where there is a region 93 of low angular velocity A for fluid and particles close to the center of the chamber, a region 94 of greater angular velocity B as the particles are less close to the center of the separator 10, a region 95 of decreasing angular velocity C and a region 96 of the greatest angular velocity D.

In general, the greater the radial location of a solid particle the greater the angular velocity and the greater the angular momentum of each solid particle. Small scale deviations to this general notion does not change the operation of the separator and one skilled in the art will recognize these variations do not change the operation of the separator and are not a limitation. The angular velocity will be determined by the inside diameter of the sphere, the pressure differential between inlet pressure and vessel pressure, the velocity of the entering fluid and solid particle components, and the viscosity of the mixture of fluid and particles. Perturbations to parameters comprising the said diameter, inlet pressure, fluid velocity, and pressure differential will be apparent to one skilled in the art to not be a limitation and to not change the inventive concept. The angular velocity will in general cause all parts of the fluid and particles to be subjected to forces including a centrifugal force that will generally cause a migration to the larger radius trajectory closer to the wall of the interior sphere. In addition, because the inlet is above the horizontal mid plane, particle solids will move lower in the chamber due to gravity and because of other apparent and real forces. As the particles drop due to gravitational effects, the inside of the sphere diameter will increase due to the inlet being above the mid-plane and the fluid velocity will decrease and this in turn will increase the likelihood of a particle settling at the bottom of the chamber. Particles that are not substantially entrained by the fluid will migrate to the lower region of the sphere and will collect. Less massive particles will remain entrained by the fluid flow and those that are not separated by the action of other forces including gravity and centrifugal force, can be mechanically separated by a mechanical filter.

In addition, FIG. 8 also shows the angular velocity is lower for small radii and greater for large radii. The lower angular velocity is found toward the middle of the chamber.

Figure 9:
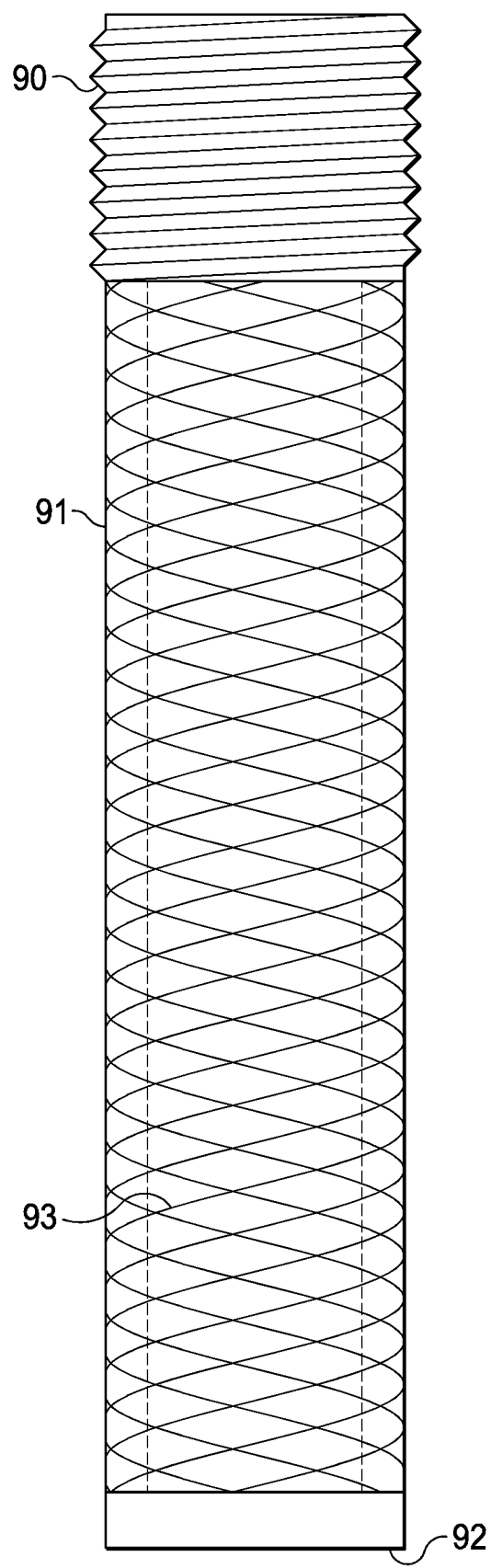
FIG. 9 shows a detail of the filtration unit.

FIG. 9 shows one embodiment of a mechanical filter element. Detail of said filter include connecting threads 90, exterior screen 91, end tube plate 92 and internal frame 93.

Figure 10:
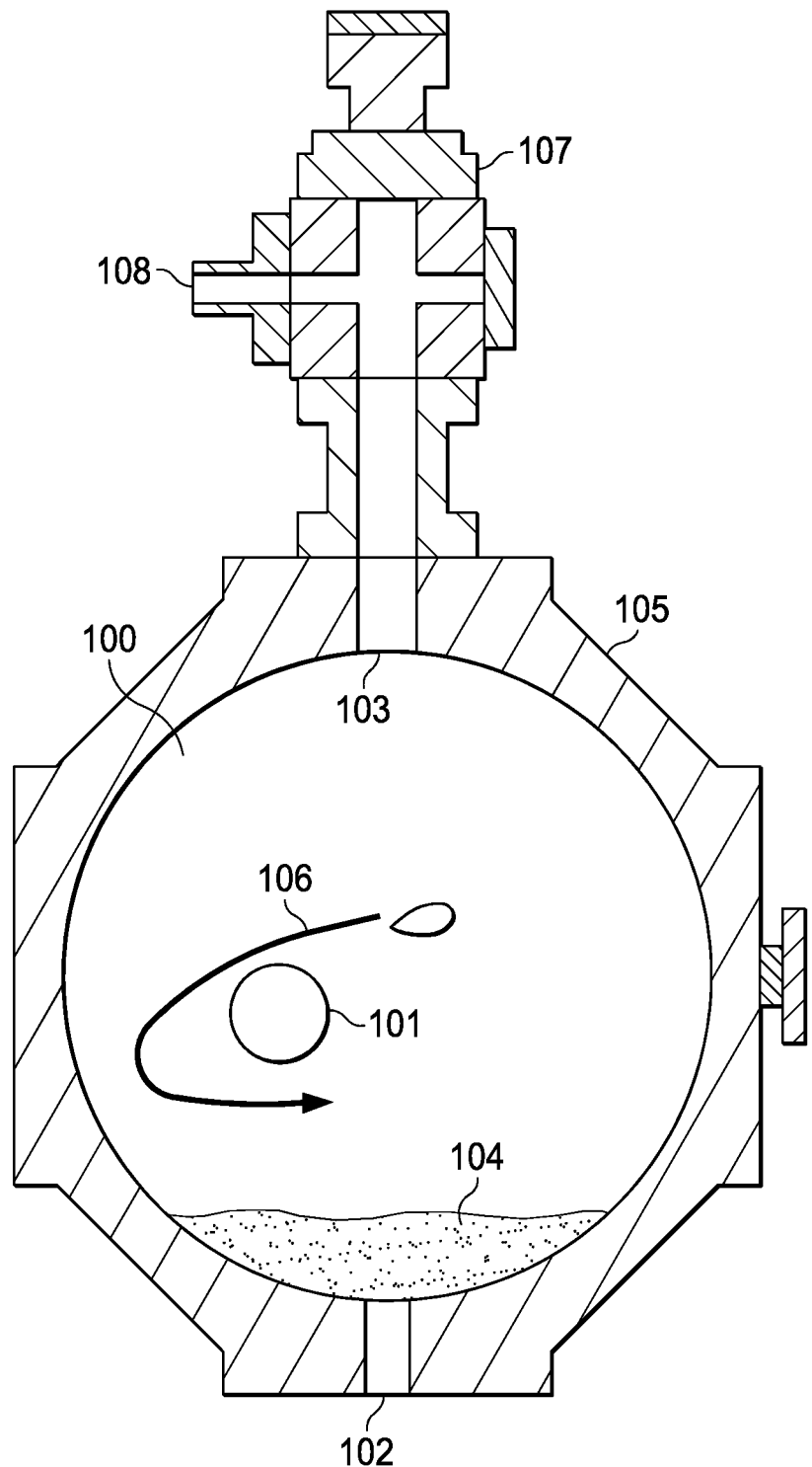
FIG. 10 is a detail of cross section of separator including location of recovered sand.

FIG. 10 shows the interior of the vessel 100 as being comprised of an essentially continuous, essentially spherical and essentially uninterrupted interior surface. FIG. 10 also indicates the fluid entrance aperture 101 on the separator interior surface. Said interior surface comprises a regular surface and openings for functionality. Openings include but are not limited to a fluid entrance, a material removal system aperture 102 and an exiting fluid penetration 103 to allow the material to exit the separator. There may be other penetrations including but not limited to pressure sensors, fluid velocity sensors, additional inlets, additional solids removal ports and additional filter fixtures. One skilled in the art will recognize that additional port openings will not substantially affect the separator function. FIG. 10 also shows a schematic of collected solid particle components 104 substantially at the bottom of the separator. The figure also shows the exterior surface 105 that may be spherical but may be other geometries as well. The figure also shows a possible particle path of motion 106 indicating among other motions a path to the lower portion of the separator. Various coupling and connection methods 107 may be used but is not a limitation to the function of this invention. The exit for fluid 108 is essentially at the top of the device and may be parallel to the midplane to allow for connection to subsequent apparatus.

Figure 11:
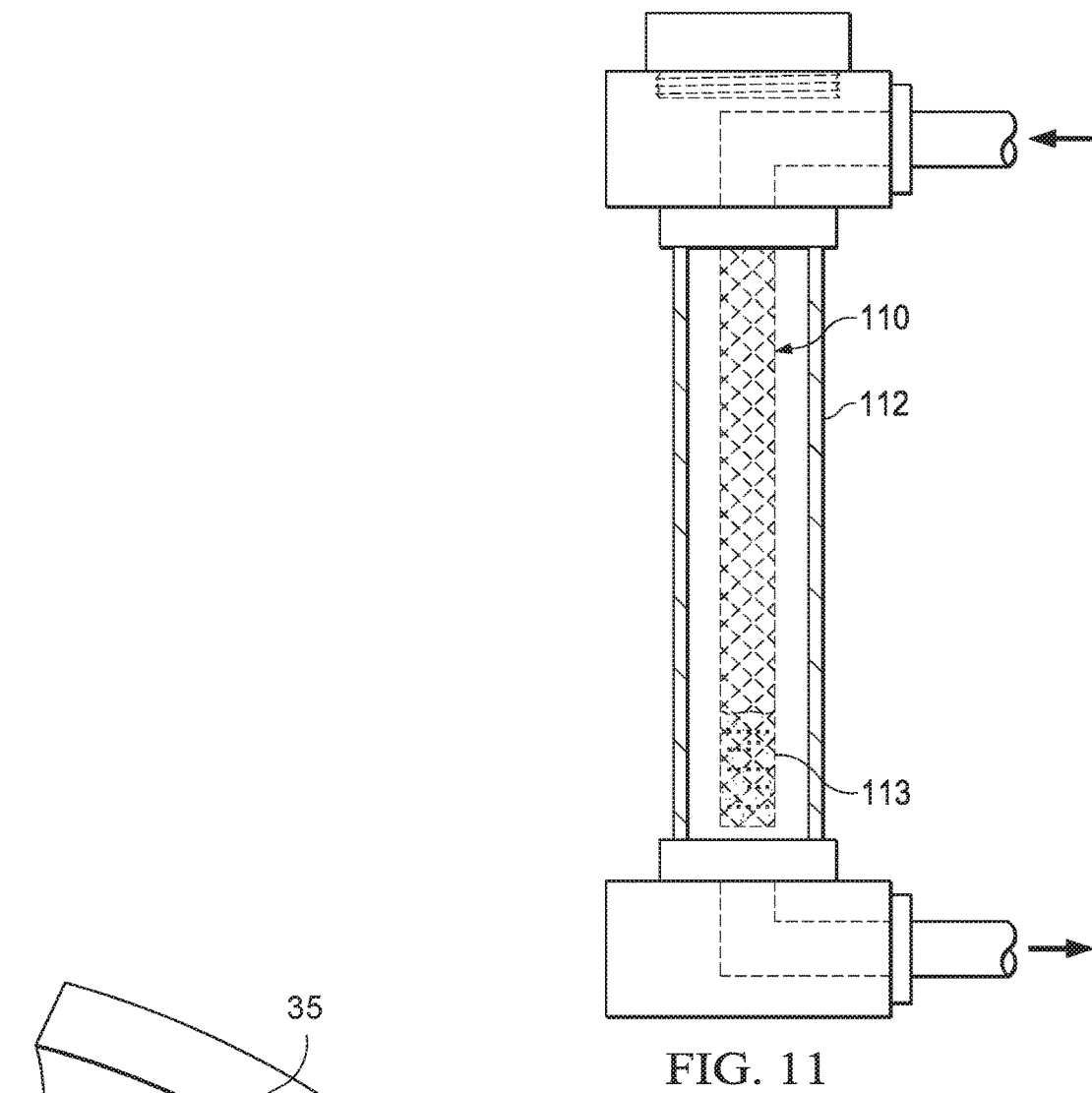
FIG. 11 shows detail of the filtration unit.

FIG. 11 shows detail of the filtration unit 112 including a filter element 110 and particles 113.

Figure 12:
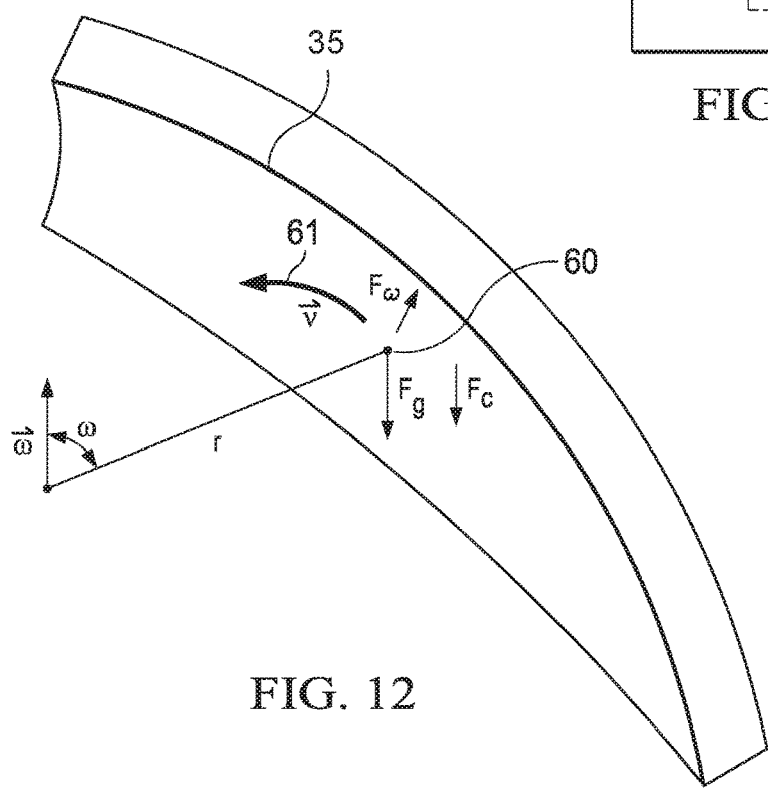
FIG. 12 is a schematic of potential real and apparent forces on a sample particle including gravitational, centrifugal and Coriolis.

FIG. 12 shows a representative particle 60 proximate to interior surface 35 with representative actual and apparent forces indicated comprised of gravity $F_g$, the Coriolis force $F_c$, centrifugal $F_\omega$, and centripetal forces v. During operation, high pressure fluid and solid particles components enter the separator interior tangentially and substantially above the horizontal midplane 37 and begin a generally circular and essentially discotic path in the separator interior, caused by the essentially spherical shape of the separator interior. A particle 60 will follow a trajectory 61, influenced by the interior surface 35 of the separator 10 and the previously named forces. This more or less discotic trajectory is substantially parallel to the device midplane 37, and more or less parallel to the earth's local surface. The rotational motion of said particle 60 causes angular momentum as represented in FIG. 8 to be imparted to the particles and fluid. Forces comprised of gravitational force and the apparent forces centrifugal and Coriolis are indicated schematically, in order to represent some of the potential actions on the solid particle component. In this case, a particle 60 has mass m, and the weight is the product of mass and gravitational constant g. In this schematic illustration, $F_g$ is the force due to gravity and is commonly the negative product of mass and gravitational constant or $-mg$, $F_\omega$ is the centrifugal force and is the vector multiplicative product of the mass and square of the velocity vector divided by the radial distance or $mv^2/r$ where bold case indicates a vector quantity, and $F_c$ is the Coriolis force and is the vector cross product of the angular velocity vector $\omega$ and linear velocity v, increased by the negative of twice the mass, $(-2m)$ or $-2m(\omega \times v)$ where x is the vector cross product.

Figure 13:
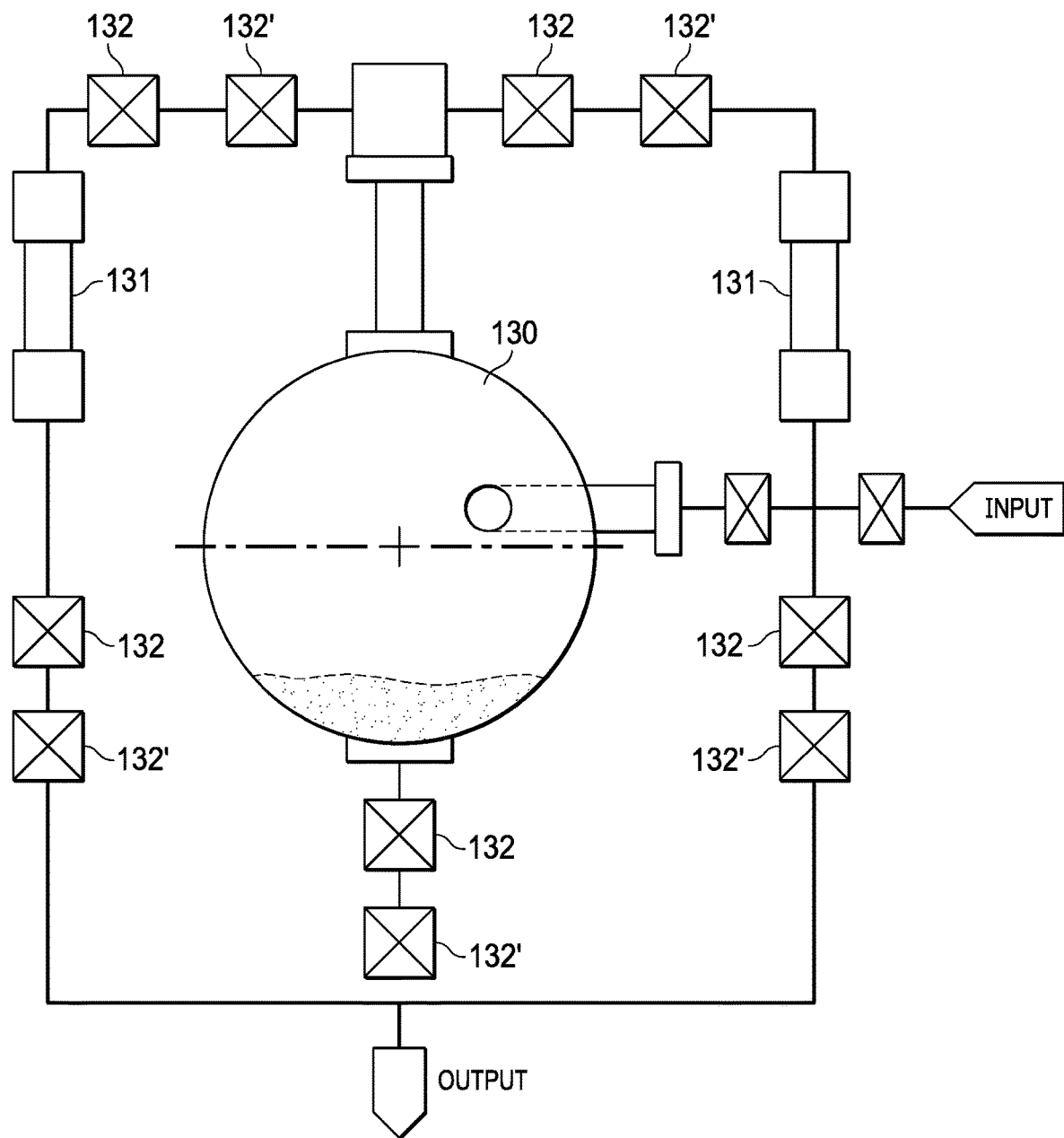
FIG. 13 shows the separator, two external filters and a plurality of valves.

FIG. 13 shows the separator 130, two external filters 131 and a plurality of valves 132, 132'.

While the invention has been particularly shown and described with reference to preferred and alternate embodiments, it will be understood by those skilled in the art that various changes in form and detail may be made therein without departing from the spirit and scope of the invention. By way of example, the fixturing and fitting to support the vessel may be changed without changed the invention. The filter element fixturing and fitting as well does not change the basic inventive nature.

REFERENCES CITED

| | | |
|---|---|---|
| U.S. Pat. No. 8,623,221 | Jan. 7, 2014 | Boyd |
| U.S. Pat. No. 7,785,400 | Aug. 31, 2010 | Worley |
| U.S. Pat. No. 6,752,860 | Jun. 6, 2004 | Hoydal |
| U.S. Pat. No. 6,315,813 | Nov. 13, 2001 | Morgan |
| U.S. Pat. No. 6,214,092 | Apr. 10, 2001 | Odom |
| U.S. Pat. No. 6,162,284 | Dec. 19, 2000 | Mitchel |
| U.S. Pat. No. 5,928,519 | Jul. 27, 1999 | Homan |
| U.S. Pat. No. 5,827,357 | Oct. 27, 1998 | Farion |
| U.S. Pat. No. 3,008,538 | Nov. 14, 1961 | Glasgow |

We claim:

1. An apparatus for separating solid particles from a moving fluid comprising:
at least one vessel comprising:
an outer surface;
an internal surface that defines an interior volume, wherein a substantially horizontal cross-section of the internal surface is round;
an inlet port in the at least one vessel aligned tangential to the internal surface;
an outlet port above the inlet port in an upper region of the at least one vessel allowing exit of the moving fluid, the outlet port defining an outlet opening;
a drain port in a lower region of the at least one vessel;
wherein the internal surface extends continuously and uninterrupted from the inlet port to the drain port and from the inlet port to the outlet opening;
wherein the round horizontal cross-section and the uninterrupted extension of the internal surface and the tangential alignment of the inlet port cause at least some of the solid particles to follow a trajectory that spirals downward along the internal surface from the inlet port to the drain port; and
wherein the uninterrupted extension of the internal surface causes at least some of the moving fluid to follow an uninterrupted trajectory from the inlet port to the outlet opening.

2. The apparatus of claim 1, further comprising at least one filter located in the outlet opening to thereby filter the moving fluid as the moving fluid flows through the outlet port.

3. The apparatus of claim 1, further comprising at least one filter outside of the interior volume and connected to the outlet port to thereby filter the moving fluid as the moving fluid flows out of the outlet port.

4. The apparatus of claim 1, wherein the inlet port is positioned above a horizontal midplane of the at least one vessel.

5. The apparatus of claim 4, wherein the inlet port is closer to the horizontal midplane of the at least one vessel than to the outlet port.

6. The apparatus of claim 1, wherein the inlet port is fluidly coupled to an inlet tube and the inlet tube is tangential to the internal surface.

7. The apparatus of claim 6, wherein the inlet tube is substantially horizontal.

8. The apparatus of claim 1 wherein the horizontal cross-section of the internal surface is substantially circular.

9. The apparatus of claim 1 wherein the horizontal cross-section of the internal surface is substantially ellipsoidal.

10. The apparatus of claim 1 wherein the horizontal cross-section of the internal surface is substantially oval.

11. The apparatus of claim 1 wherein a horizontal diameter of the interior volume is greater at a horizontal midplane of the interior volume than near the drain port and the outlet port.

12. The apparatus of claim 1 wherein a horizontal diameter of the interior volume is greater at a horizontal midplane of the interior volume than at a height of the inlet port.

13. The apparatus of claim 1 wherein a horizontal diameter of the interior volume is greatest at a horizontal midplane of the interior volume.

14. The apparatus of claim 1 wherein a horizontal diameter of the interior volume is variable along a height of the interior volume and diameter transitions of the interior volume are smooth.

15. The apparatus of claim 1 comprising a first valve fluidly connected to the drain port, wherein when the first valve is in an open position, the solid particles are allowed to flow through the drain port into a drain pipe and wherein when the valve is in a closed position, the solid particles are blocked from flowing through the drain port into the drain pipe.

16. The apparatus of claim 13 comprising a second valve fluidly connected to the drain pipe, wherein when the second valve is in an open position, the solid particles are allowed to flow downward out of the drain pipe and wherein when the second valve is in a closed position, the solid particles are blocked from flowing downward out of the drain pipe.

17. The apparatus of claim 1 wherein:
   the drain port defines a drain opening;
   wherein the internal surface extends continuously and uninterrupted from the inlet port to the drain opening; and
   wherein the round horizontal cross-section and the uninterrupted extension of the internal surface and the tangential alignment of the inlet port cause at least some of the solid particles to follow a trajectory that spirals downward along the internal surface from the inlet port to the drain opening.

18. The apparatus of claim 17 wherein the drain opening is flush with the internal surface.

19. The apparatus of claim 1 wherein the outlet opening is flush with the internal surface.

20. A method of separating solid particles from a moving fluid comprising:
   coupling the at least one vessel of claim 1 to a source of the moving fluid via the inlet port;
   introducing the moving fluid into the at least one vessel via the inlet port; and
   separating the solid particles from the moving fluid.

* * * * *